(12) United States Patent
Wallin et al.

(10) Patent No.: US 11,009,035 B2
(45) Date of Patent: May 18, 2021

(54) TWO HYBRID BALL BEARINGS AND A COMPRESSOR BEARING ARRANGEMENT

(71) Applicant: Aktiebolaget SKF, Gothenburg (SE)

(72) Inventors: Hans Wallin, Cape Coral, FL (US); Rudolf Hauleitner, Steyr (AT)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 15/962,355

(22) Filed: Apr. 25, 2018

(65) Prior Publication Data
US 2019/0331124 A1   Oct. 31, 2019

(51) Int. Cl.
*F16C 19/54* (2006.01)
*F16C 33/30* (2006.01)
(Continued)

(52) U.S. Cl.
CPC ........ *F04D 29/0566* (2013.01); *F16C 19/541* (2013.01); *F16C 19/546* (2013.01);
(Continued)

(58) Field of Classification Search
CPC .... F16C 19/163; F16C 19/181; F16C 19/541; F16C 19/543; F16C 33/62; F16C 33/303; F16C 33/6677; F16C 33/6688; F16C 2360/44; F16C 2362/52; F16C 19/183; F16C 33/583; F16C 39/02; F16C 2206/60; F16C 2204/60; F16C 19/546; F16C 33/6659; F16H 57/021; F04D 29/06; F04D 29/046; F04D 29/0626; F04D 29/0566;
(Continued)

(56) References Cited

U.S. PATENT DOCUMENTS

| 2,733,967 A | * | 2/1956 | Jones, Jr. | .............. F16C 19/182 |
| | | | | 384/615 |
| 3,056,636 A | * | 10/1962 | Mims | ...................... F16C 19/54 |
| | | | | 29/404 |

(Continued)

FOREIGN PATENT DOCUMENTS

| CA | 2384560 A1 * | 3/2001 | ............ F16C 19/184 |
| CA | 2384710 A1 * | 3/2001 | ............ F16C 19/163 |

(Continued)

OTHER PUBLICATIONS

Website: "https://www.nationalprecision.com/library/articles/bearing-preload.php" published on Mar. 8, 2016 (Year: 2016).

(Continued)

*Primary Examiner* — Marcus Charles
(74) *Attorney, Agent, or Firm* — Garcia-Zamor Intellectual Property Law; Ruy Garcia-Zamor; Bryan Peckjian

(57) ABSTRACT

Two hybrid ball bearings and a compressor bearing arrangement with two hybrid ball bearings for a rotatable support of a rotor of the compressor versus a stator of the compressor. The two hybrid ball bearings are arranged face-to-face or back-to-back, are configured with an optimal axial clearance depending on the inner diameter of a ring-shaped inner raceway element one of the hybrid ball bearings respectively a pitch diameter of one of the two hybrid ball bearings for a long bearing life in connection with an optimal compressor operating performance.

19 Claims, 3 Drawing Sheets

(51) Int. Cl.
F16C 33/58 (2006.01)
F16C 33/66 (2006.01)
F04D 29/05 (2006.01)
F04D 29/056 (2006.01)
F16C 39/02 (2006.01)

(52) U.S. Cl.
CPC .......... F16C 33/303 (2013.01); F16C 33/583 (2013.01); F16C 33/6659 (2013.01); F16C 39/02 (2013.01); F05B 2240/50 (2013.01); F05B 2280/2004 (2013.01); F16C 2204/60 (2013.01); F16C 2206/60 (2013.01); F16C 2360/44 (2013.01); F25B 2400/07 (2013.01)

(58) Field of Classification Search
CPC .... F16N 15/00; F25B 31/002; F25B 2400/07; F05D 2300/228; F05D 2240/54; F05B 2240/50; F05B 2240/2004
USPC ....... 384/492, 494, 501, 504, 515, 521, 551, 384/909, 513; 415/111, 170.1, 229
See application file for complete search history.

(56) References Cited

U.S. PATENT DOCUMENTS

| | | | | |
|---|---|---|---|---|
| 4,759,427 A * | 7/1988 | Onose | ................. | F16C 33/6662 184/39.1 |
| 5,273,413 A * | 12/1993 | Wallin | .................... | F01C 21/02 384/516 |
| 6,048,101 A * | 4/2000 | Rasmussen | ............. | F01C 21/02 384/517 |
| 6,135,641 A * | 10/2000 | Smith | ................... | F16C 19/163 384/493 |
| 6,655,846 B2 * | 12/2003 | Beckers | .................. | A61C 1/05 384/504 |
| 7,090,404 B2 * | 8/2006 | Morales | .................. | F16C 33/30 384/450 |
| 7,594,757 B2 | 9/2009 | Verhaegen | | |
| 8,360,650 B2 * | 1/2013 | Morales Espejel | ......................... | F16C 33/6692 384/462 |
| 9,541,137 B2 | 1/2017 | Mori | | |
| 10,280,973 B1 | 5/2019 | Hauleitner | | |
| 10,280,980 B2 | 5/2019 | Mori | | |
| 2006/0182376 A1 * | 8/2006 | Burwell | ............. | A63C 17/0006 384/492 |
| 2007/0242914 A1 | 10/2007 | Friedl | | |
| 2011/0254352 A1 | 10/2011 | Ciulla | | |
| 2013/0170943 A1 * | 7/2013 | Jonsson | ................ | F04D 29/051 415/1 |
| 2014/0193111 A1 | 7/2014 | Kenmochi et al. | | |
| 2014/0212082 A1 | 7/2014 | Gegner | | |
| 2015/0226266 A1 | 8/2015 | Mori | | |
| 2015/0285308 A1 | 10/2015 | Kanamoto | | |
| 2016/0010691 A1 * | 1/2016 | Lapp | ....................... | F16C 33/62 384/492 |
| 2016/0273584 A1 | 9/2016 | Braun | | |

FOREIGN PATENT DOCUMENTS

| | | | | |
|---|---|---|---|---|
| CN | 205025807 U | 2/2016 | | |
| DE | 202017106076 U1 | 10/2017 | | |
| EP | 1098098 A2 * | 5/2001 | ............. | F16C 33/30 |
| JP | H10299784 A | 11/1998 | | |
| WO | WO-2014117011 A1 * | 7/2014 | ............. | F16C 33/62 |

OTHER PUBLICATIONS

Website: "https://www.skf.com/us/products/bearings-units-housings/super-precision-bearings/principles/design-considerations/bearing_preload/actbb/index.html" published on Mar. 14, 2016 (Year: 2016).
Kaydon PDF located on SKF website. https://www.kaydonbearings.com/white_papers_12.htm (Year: 2020).
RBC bearings Duplex Pairs webpage. http://www.rbcbearings.com/thinsectionbearings-industrial/duplex.htm (Year: 2008).

* cited by examiner

TWO HYBRID BALL BEARINGS AND A COMPRESSOR BEARING ARRANGEMENT

TECHNOLOGICAL FIELD

The invention relates to two hybrid ball bearings and a compressor bearing arrangement.

BACKGROUND OF THE INVENTION

For example, in the area of refrigerant compressors, it is known in principle to supply the refrigerant itself as an ultra-low-viscosity lubricant to rolling bearings of the compressor in the sense of lubrication with ultra-pure lubricating film thickness. Apart from the liquid impurities usually present in the refrigerant, this can be a pure refrigerant lubrication. In a modification, one or more other particularly lubrication-relevant substances may be added to the refrigerant, for example, in total up to a concentration of maximum 1%. Further some of these compressors are operated at comparatively high speeds number of revolutions. So, the optimization of the bearing life time is subject to several constraints.

SUMMARY OF THE INVENTION

Two hybrid ball bearings have at least one ring-shaped inner raceway element, on which balls of at least one of the two hybrid ball bearings are rolling off, with an inner diameter, whereby the two hybrid ball bearings are configured to provide an axial clearance with zero measuring and zero mounting loads as follows, if the two hybrid ball bearings are arranged face-to-face or back-to-back:

The axial clearance is between −5 and 40 μm, if the inner diameter is smaller or equal to 80 mm, the axial clearance is between −5 and 50 μm, if the inner diameters is greater than 80 mm and smaller than or equal to 180 mm and, the axial clearance is between −5 and 70 μm, if the inner diameters is greater than 180 mm.

Two hybrid ball bearings which are configured to provide following axial clearance with zero measuring and zero mounting loads, if the two hybrid ball bearings are arranged face-to-face or back-to-back:

The axial clearance is between −5 and 40 μm, if the pitch diameter of one of the two hybrid ball bearings is smaller or equal to 100 mm, the axial clearance is between −5 and 50 μm, if the pitch diameter of one of the two hybrid ball bearings is greater than 100 mm and smaller than or equal to 200 mm and, the axial clearance is between −5 and 70 μm, if the pitch diameter of one of the two hybrid ball bearings is greater than 200 mm.

A compressor bearing arrangement has two hybrid ball bearings for a rotatable support of a rotor of the compressor versus a stator of the compressor, whereby the two hybrid ball bearings are arranged face-to-face or back-to-back with following axial clearance with zero measuring and zero mounting loads:

The axial clearance is between −5 and 40 μm, if an inner diameter of a ring-shaped inner raceway element of at least one of the two hybrid ball bearings is smaller or equal to 80 mm or if a pitch diameter of one of the two hybrid ball bearings is smaller or equal to 100 mm, the axial clearance is between −5 and 50 μm, if an inner diameter of a ring-shaped inner raceway element of at least one of the two hybrid ball bearings is greater than 80 mm and smaller than or equal to 180 mm or if a pitch diameter of one of the two hybrid ball bearings is greater than 100 mm and smaller than or equal to 200 mm and, the axial clearance is between −5 and 70 μm, if an inner diameter of a ring-shaped inner raceway element of at least one of the two hybrid ball bearings is greater than 180 mm or if a pitch diameter of one of the two hybrid ball bearings is greater than 200 mm.

Extensive series of investigations were conducted. These investigations were carried out for various sets of two hybrid ball bearings in X- and O-arrangements for a high rotation speed (between 2500 and 25000 rpm or ndm-values being between 500000 and 1200000 mm/60 s) refrigerant compressor application. The bearings particularly hybrid angular contact ball bearings were lubricated with an ultra-low viscosity lubricant forming an ultra-thin lubrication film thickness of 200 nm or less, in particular a modern, environmental friendly refrigerant, or a refrigerant with one or more other particularly lubrication-relevant substances up to a total concentration of 1%. Thereby bearing sets of various dimensions and internal and external tolerances were investigated. These investigations were focusing on an optimized bearing life in connection with an optimized compressor operating performance. Thereby the key findings of these extensive investigations were that a long bearing life together with a good compressor operating performance is strongly influenced be the correct selection of the axial clearance of the two hybrid ball bearings and that the optimal axial clearances are dependent on the bearing size, particularly on the inner diameter of a ring-shaped inner raceway element (or short inner ring) of the bearings, respectively the ball pitch diameter e.g. for arrangements where no classic bearing inner ring exists, e.g. if the inner raceway is directly manufactured on the rotating shaft. Whereas particularly a too small axial clearance leads to high internal bearing load conditions, high contact stresses and break-throughs of the lubricant film resulting in a short bearing life. On the other hand, if the axial clearance is too big sliding motion occurs between the balls and the raceways, the contact stress are too low to cause an increase in viscosity and the lubricant film thickness is reduced, causing further wear and a short bearing life. Bearing stiffness and rotor positioning accuracy are also negatively affected by too large clearance. So, the design rules in the paragraphs above ensure a long bearing life in connection with a good compressor operating performance.

Further advantages, features and details of the invention result from the exemplary embodiments of the invention described in the following with reference to the figures.

DETAILED DESCRIPTION

Figures 1A, 1B:
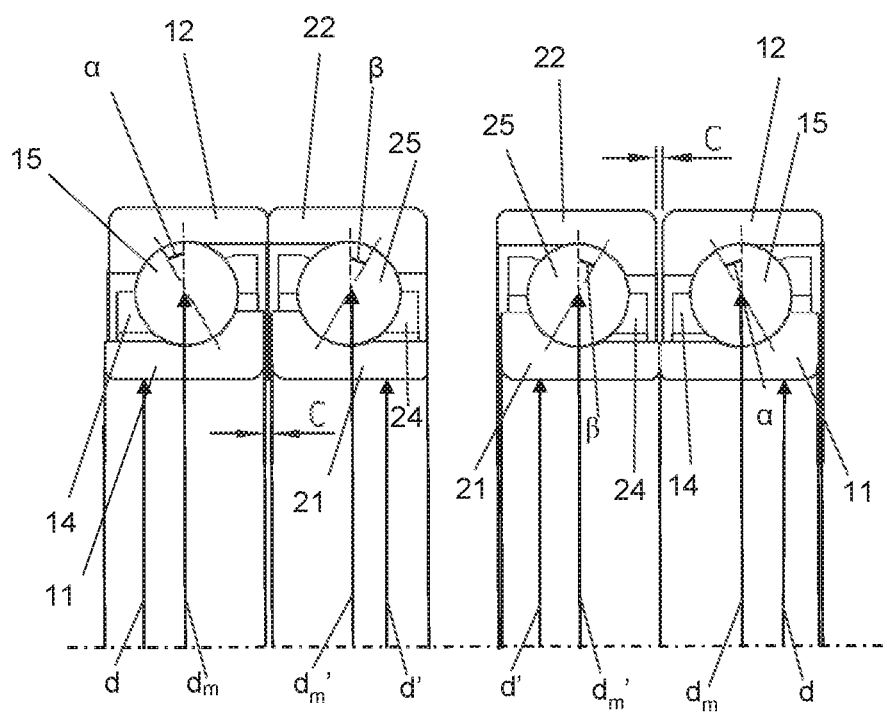
FIGS. 1a and 1b show longitudinal sections through the upper half of two hybrid ball bearings, which are arranged face-to-face in FIG. 1a and back-to-back in FIG. 1b.

FIGS. 1a and 1b show as embodiments of the invention longitudinal sections through the upper half of two hybrid ball bearing. Thereby FIG. 1a shows a bearing arrangement of two hybrid angular contact ball bearings which are arranged to each other in a face-to-face arrangement what is also called a X-arrangement. FIG. 1b shows a bearing arrangement of two hybrid angular contact ball bearings which are arranged to each other in a back-to-back arrangement what is also called a O-arrangement. Each of the two hybrid angular contact ball bearings of FIGS. 1a and 1b comprises a ring-shaped outer raceway element 12 and 22 and an inner raceway element 11 and 21. The inner and outer raceway elements 11, 21, 12 and 22 are made of a stainless steel, particular a high nitrogen stainless steel, e.g. Chromex 40, Cronidur 30; X30CrNoN15-1, X40CrMoVN16-2, Nitro-Max or similar with a hardness bigger than HRC 58 at least at the raceways and a corrosion resistance with a pitting potential higher or equal to −225 mV according to ASTM G61-86. The inner raceway elements 11 and 21 have an inner diameter d respectively d'.

Series of ceramic balls 15 and 25 e.g. of Si3N4 are arranged for each ball bearing between the inner and outer raceway elements 11, 21, 12 and 22 of the respective ball bearing. The balls 15 and 25 are snapped and held in cages 14 and 24. In this case, the cages 14 and 24 prevent mutual contact of the balls 15 and 25 within the respective row of balls 15 and 25. The cages 14 and 24 are made of fiber-reinforced PEEK. Thereby the row of balls 15 defines a pitch diameter dm being the diameter of a circle going through the center points of all balls 15; and the row of balls 25 defines in a similar manner the pitch diameter dm'.

Each of the hybrid angular contact ball bearings shows a contact angle α respectively β. This contact angle α respectively β is the angle between a connecting line between the nominal contact points of a ball 15 or 25 with the outer and inner raceway element 12 and 11 respectively 22 and 21 on the one side and a plane of the ball bearing being perpendicular to the axial direction on the other side.

In FIGS. 1a and 1b the two hybrid angular contact ball bearings are identical particularly meaning that the inner diameters d and d', the pitch diameters dm and dm' and the contact angles α and β are identical. In other embodiments, particularly the contact angles α and β are different from each other e.g. to cope with different expected axial loads in the one and the other axial direction. Of course, there are specific cases where also the inner diameters d and d' and/or the pitch diameters dm and dm' of the two hybrid ball bearings are different from each other.

The two hybrid ball bearings are configured and manufactured for high rotation speeds between 2500 and 25000 rpm or ndm-values being between 500000 and 1200000 mm/60 s, whereby the ndm-value is the multiplication result of the rotation speed and the pitch diameter dm or dm'. Further the two hybrid ball bearings are configured and manufactured the way that they exhibit in not used, as new respectively not run in conditions a specific axial clearance C with zero measuring and zero mounting loads as explained above as the cognition of this invention to ensure optimized bearing life together with optimized compressor operating performance.

More particularly the two hybrid angular contact ball bearings have an inner diameter d=d'=150 mm, a pitch diameter dm=dm'=187.5 mm, a contact angle α=β=15° and the axial clearance C with zero measuring and zero mounting loads is around 40 μm. In another embodiment, which varies from the aforementioned, the contact angles α and β of the two hybrid ball bearings are different, e.g. α=15°, β=30° and C is then around 38 μm.

Thereby a negative axial clearance C has to be understood by referring to FIGS. 1a and 1b as follows: With respect to the face-to-face arrangement of FIG. 1a a negative axial clearance C means that the axial gap is no longer between the two inner raceway elements 11 and 21 which are then contacting each other, but between the two outer raceway elements 12 and 22 showing the absolute value of the negative axial clearance C. With respect to the back-to-back arrangement of FIG. 1b a negative axial clearance C means that the axial gap is no longer between the two outer raceway elements 12 and 22 which are then contacting each other, but between the two inner raceway elements 11 and 21 showing the absolute value of the negative axial clearance C.

Thereby the two hybrid angular contact ball bearings can be paired bearings, what increases the degree of freedom to ensure the desired axial clearance C; or they are unpaired what increases the demand on the tolerances on the single bearing to ensure the desired axial clearance C, but of course makes it easier from a handling and mounting perspective as no pair relationship has to be followed.

Of course, in other embodiments there can be one or more additional hybrid ball and/or roller particularly cylindrical roller bearings on the left and/or the right side of the bearings of FIGS. 1a and 1b or also in between the two bearings of FIGS. 1a and 1b depending on the required load carrying capacity at the respective installation location of the bearings and the application requirements. Thereby these additional bearings do not influence said axial clearance of the two bearings in FIGS. 1a and 1b.

Figure 2:
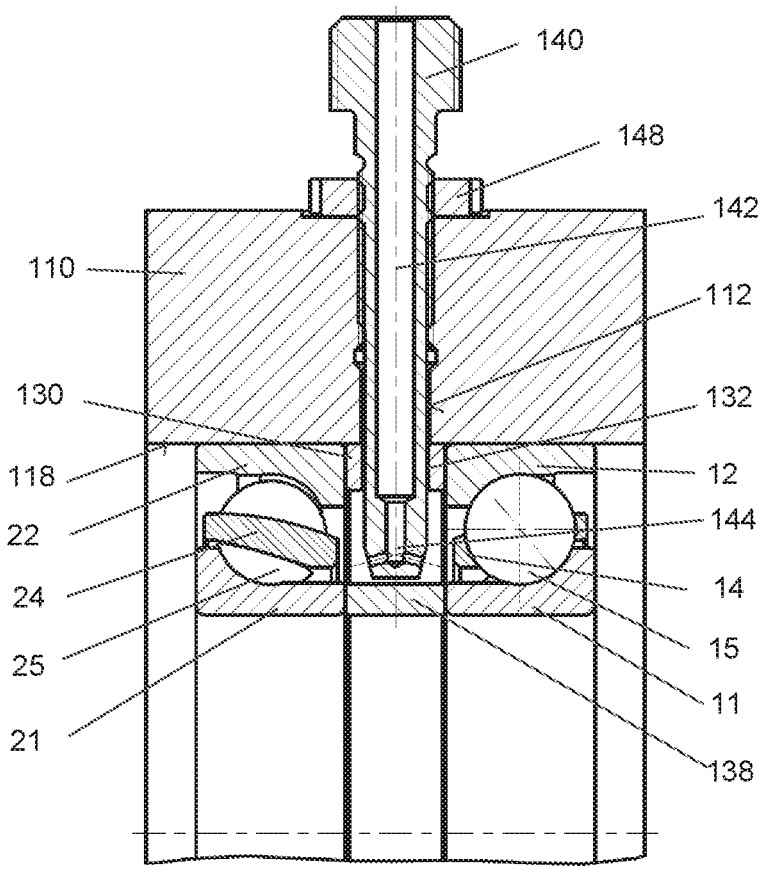
FIG. 2 shows a longitudinal section through an upper region of a bearing arrangement of a refrigerant compressor.
Figure 3:
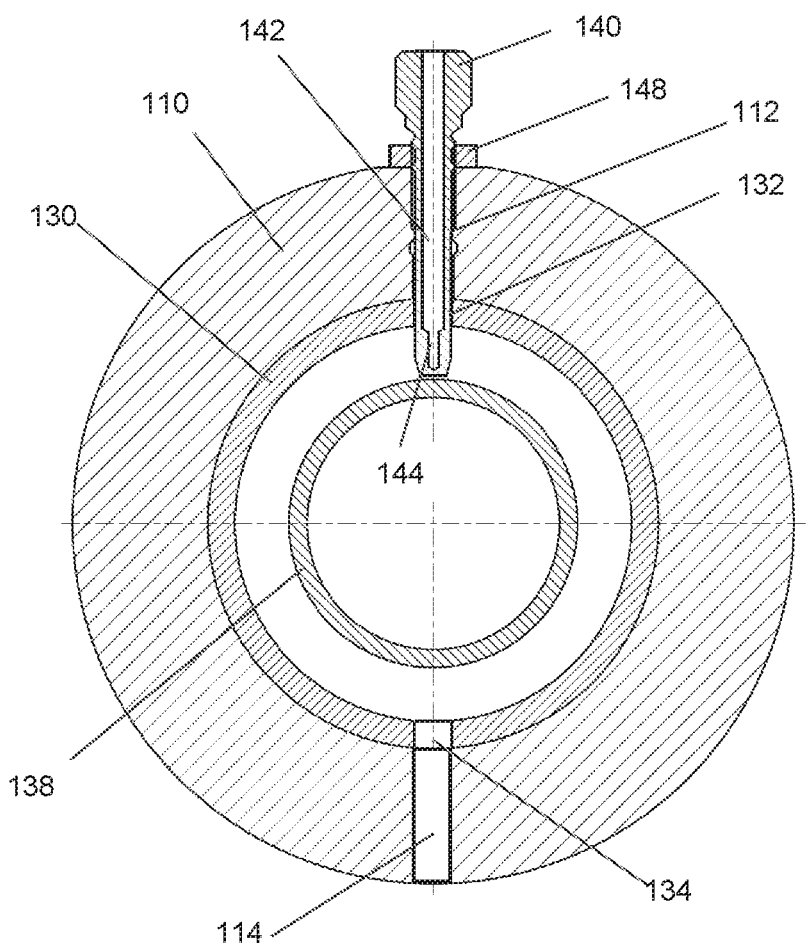
FIG. 3 shows a cross-section through the center of the arrangement in FIG. 2.

FIG. 2 shows, as an exemplary embodiment of the invention, a longitudinal section through an upper region of a bearing arrangement of a refrigerant compressor, in particular of a large centrifugal air-conditioning compressor with a direct drive, and FIG. 3 shows a cross-section through the center of the illustration of FIG. 2. The compressor comprises a housing 110, of which, in FIGS. 2 and 3, only the regions which are in connection with the bearing arrangement are shown. Furthermore, the housing 110 comprises an axial circular cylindrical bore 118 which receives the hybrid ball bearings and an outer intermediate ring 130.

In the bore 118, two hybrid angular contact ball bearings according to FIG. 1b are spaced apart from one another by the outer intermediate ring 130. The ring-shaped outer raceway elements 12 and 22 are fixed in the housing 110 in a manner known per se and not shown in detail. Also, the inner raceway elements 11 and 21 are secured in the manner not shown in the known manner on the shaft of the compressor, which is also not shown, which is provided for rotation relative to the housing 110. In this case, the shaft can, for example, merge into a rotor of an electric machine serving to drive the shaft. To the right of the illustration of FIG. 2, a blade wheel of the compressor for the refrigerant of the air-conditioning system can be arranged on the shaft, for example. Anyhow the shaft may have another bearing location distanced from the one show in FIG. 2 e.g. on the other axial side of the drive. This other bearing location can be of identical, similar, but also different design as shown in FIGS. 2 and 3.

The series of ceramic balls 15 and 25 are arranged between the outer and inner raceway elements 12, 22, 11 and 21 of the respective ball bearing. The balls 15 and 25 are respectively snapped and held in the cages 14 and 24. The cages 14 and 24 prevent mutual contact of the balls 15 and 25 within the respective row of balls 15 and 25.

The outer intermediate ring 130 is arranged between the two outer raceway elements 12 and 22 of the two hybrid angular-contact ball bearings, and an inner intermediate ring 138 is arranged between the inner rolling-surface elements 11 and 12 of the two ball bearings. The housing 110 comprises a radial circular cylindrical bore 112 into which a nozzle 140 for the refrigerant penetrating through the bore 112 can be screwed. The outer intermediate ring 130 is formed with a slot 132 aligned with the radial bore 112 and a radial, circular cylindrical penetration 134 opposite the slot 132. The radial penetration 134 corresponds in its position to a radial bore 114 provided in the housing 110, which serves as a drain for the refrigerant supplied to the bearing arrangement.

The bearing arrangement is configured for lubrication with a more or less pure, oil-free refrigerant, for example one of the modern, environmental friendly refrigerants or with a refrigerant with one or more other particularly lubrication-relevant substances up to a total concentration of 1%, as follows: The nozzle 140 passing through the bore 110 as well as the slot 132 of the intermediate ring 130 is screwed into the bore 112 of the housing 110 and secured, for example, by means of an adjusting nut 148. For this purpose, the nozzle 140 is designed, at least in its upper region, with an external thread and the bore 112, at least in its upper region, with an internal thread corresponding thereto. Furthermore, the nozzle 140 comprises a channel 144 which, on the bearing side, merges into a Y-shaped outlet channel 144. The Y-shaped design of the channel 144 is thereby of particular advantage, if for example not enough space is available for a T-shaped design.

When a corresponding refrigerant line is connected at the upper end of the nozzle 140, the refrigerant feed is then effected via the channel 142. The refrigerant is then conveyed via the Y-shaped outlet channel 144 between the lower edge of the cages 14 and 24 and the outer mantles of the inner raceway elements 11 and 21 and therewith directly injected into the rolling zones of the hybrid angular contact ball bearings. For this purpose, the ball bearings as well as the nozzle 140 are configured in a structurally and geometrically coordinated manner with respect to one another, such as the screw-in depth into the bore 112.

During operation of the compressor, the refrigerant is supplied in liquid form in saturated condition. The bearing arrangement is configured in such a way that a pressure situation for the refrigerant is maintained, which largely prevents the refrigerant from passing over into the gaseous state. In particular, the diameters of the Y-shaped outlet channel are correspondingly dimensioned. Furthermore, the bearing geometry, in particular with regard to an axial free passage possibility for the injected refrigerant, but also the geometry of the drain 114, are correspondingly designed, particularly in a limiting manner. Thereby the diameters of the channels are dimensioned such that there is a very little pressure drop upstream the Y-shaped outlet channel 144. The refrigerant passes the outlet channel 144 in liquid form. After leaving the outlet channel 144 some refrigerant is transformed into gas, depending on the pressure drop across the outlet channel 144, the bearing friction and the time it takes to flow through.

In other embodiments, the outer intermediate ring 130 can also be installed rotated by 180° so that the penetration 134 is aligned with the bore 112 and the slot 132 with the bore 114. There are also embodiments in which the slot 132 and the penetration 134 do not lie opposite to one another, but are arranged to be circumferentially staggered by 160° or 140°, for example. In further other embodiments, the slot 132 can be replaced by a further radial penetration. Furthermore, the outer intermediate ring can also comprise a plurality of penetrations for more than one nozzle and possibly also for further outflows. Alternatively, the drain 114 and an associated penetration or slot of the outer intermediate ring may be dispensed with.

In other embodiments, the inner intermediate ring 138 can support the introduction of the refrigerant into the rolling-off zones, in particular by a radially outwardly bulged configuration of its outer shell, for example in the form of a roof. In still other embodiments, the nozzle can, of course, also be fastened in another way in the housing.

Of course, it has to be emphasized that the intermediate rings 130 and 138 do not affect the desired axial clearance C with zero measuring and zero mounting loads of the bearings. In other embodiments, it also can be a one-piece intermediate ring or also more of such intermediate rings, respectively further bearings. In other embodiments, it also can be e.g. a single washer located between the inner raceway elements 11 and 21 or the outer raceway elements 12 and 22, particularly in connection with a different supply of the lubricating refrigerant, e.g. axially from at least one of the side faces. Thereby then also the washer can be included in the arrangement to control the desired axial clearance C, whereby in principle also such intermediate ring(s) can be used and configured for this.

What is claimed is:

1. Two hybrid ball bearings comprise:
   a first hybrid ball bearing, comprising a first inner ring and a first outer ring, the first outer ring having a first inner diameter on which a first plurality of balls roll thereon;
   a second hybrid ball bearing comprising a second inner ring and a second outer ring, the second outer ring having a second inner diameter on which a second plurality of balls roll thereon;
   wherein one of: (1) the first inner ring and the second inner ring, or (2) the first outer ring and the second outer ring are axially aligned and in abutting contact, and the other one of: (1) the first inner ring and the second inner ring, or (2) the first outer ring and the second outer ring are axially aligned and spaced so as to define an axial clearance therebetween, wherein the axial clearance is less than or equal to seventy micrometers (70 µm);
   wherein the first hybrid ball bearing and the second hybrid ball bearing are configured to provide an axial clearance with zero mounting loads.

2. The two hybrid ball bearings according to claim 1, wherein the two hybrid ball bearings are identical.

3. The two hybrid ball bearings according to claim 1, wherein the first and second inner rings and the first and second outer rings are made of a stainless high nitrogen steel for rolling bearings, the first and second plurality of balls are made of a ceramic material and cages for the balls are made of glass-fiber-reinforced PEEK.

4. The two hybrid ball bearings according to claim 1, wherein the first of the two hybrid ball bearings comprises: a first outer and a first inner ring-shaped raceway element, wherein the second of the two hybrid ball bearings comprises a second outer and a second inner ring-shaped raceway element, and wherein at least one hollow-cylindrical distance element, comprising a lubrication spacer or distance ring, is provided and positioned between the two outer raceway elements or the two inner raceway elements.

5. The two hybrid ball bearings according to claim 1, wherein the two hybrid ball bearings are hybrid angular contact ball bearings with contact angles between 15 and 30°.

6. The two hybrid ball bearings according to claim 5, wherein the contact angles of the two hybrid ball bearings are different, and where the contact angle of a first of the two hybrid ball bearings is between 10 to 20° and the contact angle of the second of the two hybrid ball bearings is between 21 to 35°.

7. The two hybrid ball bearings according to claim 1, wherein at least one of the two hybrid ball bearings is configured for high rotation speeds between 2500 and 25000 rpm or ndm-values being between 500000 and 1200000 mm/60 s, wherein the ndm-value is the multiplication result of the rotation speed and the pitch diameter.

8. The two hybrid ball bearings according to claim 1, wherein the two hybrid ball bearings are paired forming a synchronized set.

9. The two hybrid ball bearings according to claim 1, wherein the two hybrid ball bearings are in a not used, as new, not run in condition and are identical.

10. The two hybrid ball bearings according to claim 1, wherein the two hybrid ball bearings are hybrid angular contact ball bearings with contact angles between 15 and 30°.

11. The two hybrid ball bearings according to claim 10, wherein the contact angles of the two hybrid ball bearings are different, wherein particularly the contact angle of a first of the two hybrid ball bearings is between 10 to 20° and the contact angle of the second of the two hybrid ball bearings is between 21 to 35°.

12. The two hybrid ball bearings according to claim 1, wherein at least one of the two hybrid ball bearings is configured for high rotation speeds between 2500 and 25000 rpm or ndm-values being between 500000 and 1200000 mm/60 s, wherein the ndm-value is the multiplication result of the rotation speed and the pitch diameter.

13. The two hybrid ball bearings according to claim 1, wherein the two hybrid ball bearings are paired forming a synchronized set.

14. The two hybrid ball bearing according to claim 1, wherein the first inner diameter is smaller than or equal to eighty millimeters (80 mm) and the axial clearance is less than forty micro-meters (40 μm).

15. The two hybrid ball bearing according to claim 1, wherein the first inner diameter is greater than eighty millimeters (80 mm) and smaller than or equal to one hundred eighty millimeters (180 mm) and the axial clearance is less than fifty micro-meters (50 μm).

16. The two hybrid ball bearing according to claim 1, wherein the first inner diameter is greater than one hundred eighty millimeters (180 mm).

17. A compressor bearing arrangement comprising:
two hybrid ball bearings for a rotatable support of a rotor of the compressor versus a stator of the compressor, wherein
the two hybrid ball bearings have an axial clearance with zero mounting loads, comprising:
a first hybrid ball bearing, comprising a first inner ring and a first outer ring, the first outer ring having a first inner diameter on which a first plurality of balls roll thereon;
a second hybrid ball bearing comprising a second inner ring and a second outer ring, the second outer ring having a second inner diameter on which a second plurality of balls roll thereon;
wherein one of: (1) the first inner ring and the second inner ring, or (2) the first outer ring and the second outer ring are axially aligned and in abutting contact, and the other one of: (1) the first inner ring and the second inner ring, or (2) the first outer ring and the second outer ring are axially aligned and spaced so as to define an axial clearance therebetween, wherein the axial clearance is less than or equal to seventy micro-meters (70 μm).

18. The compressor bearing arrangement according to claim 17, wherein the first of the two hybrid ball bearings comprises a first outer and a first inner ring-shaped raceway element and the second of the two hybrid ball bearings comprises a second outer and a second inner ring-shaped raceway element, and wherein at least one hollow-cylindrical distance element, particularly a lubrication spacer or distance ring, is provided being positioned between one of the two outer and the two inner raceway elements.

19. The compressor bearing arrangement according to claim 17, wherein the two hybrid ball bearings are hybrid angular contact ball bearings with contact angles between 10 and 40°, particularly between 15 and 30°.

* * * * *